United States Patent [19]

Schutz

[11] 4,264,368
[45] Apr. 28, 1981

[54] ADMIXTURES AND METHOD FOR ACCELERATING THE SETTING OF PORTLAND CEMENT COMPOSITIONS

[75] Inventor: Raymond J. Schutz, Augusta, N.J.

[73] Assignee: Sika Chemical Corporation, Lyndhurst, N.J.

[21] Appl. No.: 859,874

[22] Filed: Dec. 12, 1977

Related U.S. Application Data

[63] Continuation of Ser. No. 565,711, Apr. 7, 1975, abandoned, and a continuation-in-part of Ser. No. 493,977, Aug. 1, 1974, abandoned.

[51] Int. Cl.³ .............................................. C04B 7/02
[52] U.S. Cl. .................................... 106/90; 106/315
[58] Field of Search ............................ 106/90, 315, 97

[56] References Cited

U.S. PATENT DOCUMENTS

| | | | |
|---|---|---|---|
| 2,174,051 | 9/1939 | Winkler | 106/27 |
| 2,465,278 | 3/1949 | Schenker et al. | 106/314 |
| 2,542,364 | 2/1951 | Schenker et al. | 106/88 |
| 3,144,347 | 8/1964 | Cowan | 106/90 |
| 3,547,853 | 12/1970 | Kalandiak | 260/29.6 |
| 3,656,985 | 4/1972 | Bonnel et al. | 106/90 |
| 3,782,984 | 1/1974 | Allemand et al. | 106/90 |

FOREIGN PATENT DOCUMENTS

| | | |
|---|---|---|
| 1265022 | 3/1968 | Fed. Rep. of Germany. |
| 47-13680 | 4/1972 | Japan. |
| 329330 | 4/1930 | United Kingdom. |
| 405508 | 2/1934 | United Kingdom. |
| 755803 | 8/1956 | United Kingdom. |
| 1056621 | 1/1967 | United Kingdom. |
| 1308214 | 2/1973 | United Kingdom. |

OTHER PUBLICATIONS

Brunauer et al. "The Chemistry of Concrete", Scientific American, vol. 210, pp. 80-92, 04001964.
Lea, F. M. "The Chemistry of Cement and Concrete", Edward Arndd Ltd. 1956, pp. 252 & 253.
Feldman et al., "The Influence of $CaSO_4\text{-}aH_2O$ upon the Hydration Character of $3CaO\ Al_2O_3$", Magazine of Concrete Res. 18, pp. 185-196 (1966).
Feldman et al., "Character of Hydration of $3CaO\text{-}Al_2O_3$", Journal of the American Ceramic Society, 49, pp. 268-272 (1966).
Chem. Abs., 69, 5001k (1968).
Chem. Abs. 78 127992n (1973).
Chem. Abs., 79 82866e (1974).
K.E. Daugherty and M. J. Kowalewski, Jr. "Effects of Organic Compounds on the Hydration Reactions of Tricalcium Aluminate", proc. of the Fifth Inter'l Sym. on the Chem. of Cem. Japan (1968) pp. 42-52.

Primary Examiner—L. Dewayne Rutledge
Assistant Examiner—John P. Sheehan
Attorney, Agent, or Firm—Pennie & Edmonds

[57] ABSTRACT

A method of and compositions for accelerating the setting time of portland cement compositions are disclosed. Certain α-hydroxy carbonyl compounds in particular ranges of concentrations relative to the cement are employed as accelerators. The concentration of admixture relative to cement necessary to achieve acceleration depends upon the identity of the admixture, the water-cement ratio, and the amount and type of aggregate in the composition, among other factors. The accelerators are especially useful in shotcrete applications.

38 Claims, 4 Drawing Figures

ADMIXTURES AND METHOD FOR ACCELERATING THE SETTING OF PORTLAND CEMENT COMPOSITIONS

CROSS REFERENCE TO THE PARENT APPLICATION

This is a continuation of application Ser. No. 565,711, filed Apr. 7, 1975 which in turn is a continuation-in-part of application Ser. No. 493,977 filed Aug. 1, 1974.

BACKGROUND OF THE INVENTION

This invention relates to a method of accelerating the setting time of concretes, mortars, and other compositions containing portland cement (i.e. "portland cement compositions") and to the use as accelerators of certain α-hydroxy carbonyl compounds, primarily hydroxyacetic (glycolic) acid, lactic acid, and certain salts of hydroxyacetic, lactic, 2-methyllactic, and dl-mandelic acids, in concentrations relative to the cement within ranges as specified herein.

Additives for modifying the setting time and other properties of portland cement compositions have been employed virtually since the beginning of cement technology in the 1870's. Cement itself, a mixture of (1) a lime-containing material such as limestone, shell or chalk, and (2) clay or a source of clay such as shale or slate, flash sets in a matter of seconds or minutes when mixed with water, leaving virtually no time for adequate mixing, pouring, or other necessary processing operations. To make it commercially useful, therefore, essentially all cement as sold contains a few percent gypsum, which delays setting for a number of hours. In order to shorten or lengthen setting time for specific applications, accelerating or retarding admixtures are employed. Such admixtures are defined by ASTM publication C 494-71, which also defines "water reducing" admixtures as those which reduce the amount of water necessary to produce concrete of a given consistency. Both accelerating and retarding admixtures are known which also effect water reduction.

The setting times for commercially available cements vary fairly widely, but are typically on the order of three hours as determined by the final setting time of the Vicat Needle method (ASTM C 191). The setting times of mortars made with such cements measured by the initial setting time of the Proctor Needle test (ASTM C 403) is about seven hours. (As is widely recognized in this art, both the Vicat Needle and Proctor Needle tests may be used to determine setting times of various portland cement compositions of various proportions, e.g. water-cement ratios, and are not restricted to the specific compositions and proportions of ingredients recited in ASTM C 191 and ASTM C 403. As used herein, the terms "Vicat Needle test" and "Proctor Needle test" refer to carrying out generally the procedures specified in the ASTM references on the particular sample of portland cement composition of interest.) These setting times must be significantly reduced, for example, in the manufacture of molded concrete products such as concrete blocks, in the manufacture of pavements and bride surfaces, and in the construction of concrete buildings. In numerous applications, the impetus for shortening the setting time is at least in part the high cost of overtime labor.

One application which inherently demands very short setting times is shotcreting, a process of spraying mortar on a supporting surface to obtain both structural strength and desired surface properties. Shotcreting is employed for example in the construction of tunnels drilled through rock, and the concrete must achieve a high percentage of its ultimate strength after it is sprayed on in a shorter period than the relaxation time of the rock in order to prevent the tunnel from collapsing.

There are both so-called wet and dry shotcrete processes. In the wet process, the cement mixture including water is fully prepared and then sprayed on the tunnel wall or other surface from a nozzle. In the dry process, all the dry ingredients are mixed and fed to the nozzle, and the water is added in the nozzle. Note that greater acceleratiion of setting time can be achieved generally with the dry process because there is no risk of the mixture setting up in the equipment prior to being sprayed. In either process the shotcrete must harden in less than fifteen minutes as measured by the Proctor Needle test final setting time in order that a useful thickness of shotcrete may be applied to a surface without its sloughing off.

Accelerating admixtures for shotcreting in general commercial use today are mixtures of sodium carbonate and sodium aluminate. While they afford acceptable early strengths relative to plain mortar, they typically reduce the ultimate strength of the mortar by more than half, requiring the use of thicker layers of mortar than would be necessary in the absence of the accelerator to achieve the same structural strength. Additionally, these admixtures are highly caustic and great care must be taken in handling them. Only a limited degree of acceleration can be achieved with sodium carbonate-sodium aluminate accelerators without reducing the ultimate strength of the shotcrete to an unacceptable level. There exist applications requiring shorter setting times and rapid early strength development for which no satisfactory accelerating admixtures have been available.

A second application which requires very fast setting times is the use of portland cement plugging compounds. Plugging compounds consist of portland cement, fine aggregate such as mason's sand, and an accelerator and are used to repair broken or cracked concrete when water is leaking through the fracture. Plugging compounds must have a final setting time as measured by the Vicat Needle test of less than fifteen minutes in order to ensure that the compound will harden and stop the leak before it is washed away.

Portland cement compositions used to repair damaged concrete articles and structures must harden quickly so that the time taken to make the repair will be short. Quick-setting-mortar compounds generally consist of portland cement, fine aggregate, and an accelerator and are used for repairing chipped or cracked concrete and other small jobs. They require final setting times of thirty minutes or less as measured by the Vicat Needle method. Concrete patching compounds contain cement, coarse and fine aggregate, and an accelerator and are generally used for making larger repairs such as filling potholes in concrete pavement. Concrete patching compounds must have final setting times of one hour or less as measured by the Vicat test; the setting times typically being somewhat longer than the setting times of quick-setting-mortar compounds because of the longer time required to mix and apply the larger quantities of concrete patching compound. The Vicat Needle test may be carried out directly on samples of mortar. In the case of concrete, the Vicat test is carried out on the mortar of the sample, which may be separated from the coarse aggregate by sieving, as provided in ASTM C 403.

Perhaps the most widely used accelerator for most concrete applications is calcium chloride. Although it does not accelerate setting times sufficiently for use in shotcrete processes, it is used for most other applications and has the advantage of being very inexpensive. It is severely limited, however, in that chloride ion is highly corrosive in contact with ferrous metals, and also promotes an electrochemical reaction between dissimilar metals. Hence calcium chloride generally cannot be used as an accelerator for reinforced concrete or other applications involving concrete-metal interfaces.

It has been known since the late 1930's that certain organic hydroxy carbonyl compounds could influence the setting times of portland cement, but in a manner precisely opposite that contemplated by this invention. The prior art teaches that certain hydroxy carbonyl compounds, including some of the α-hydroxy carbonyl compounds of the present invention, retard the setting of portland cement rather than accelerate it. This prior art, the most pertinent of which is discussed below, does not disclose or suggest the accelerators of the present invention and in fact teaches away from the present invention. In spite of the widely-recognized drawbacks of the accelerators in use today, it has not been recognized that the α-hydroxy carbonyl compounds of the present invention function as suitable accelerators for the applications disclosed even though certain of these compounds are disclosed in the prior art as admixtures for portland cement.

A review of the prior art relating to accelerators in general and to hydroxy-carbonyl retarders demonstrates that it is difficult to make generalizations about the effect of broad classes of compounds on the setting times of portland cement. For example, although the essentially ionic salt calcium chloride is an efficient accelerator, sodium chloride and potassium chloride, also ionic chlorides, are substantially less efficient accelerators. Moreover merely because a particular compound functions as an accelerator does not imply that there are concentrations at which it will shorten setting times sufficiently to be used in applications such as shotcrete and plugging compounds which require particularly short setting times. As noted above, for example, calcium chloride is a widely used accelerator for portland cement, but it does not shorten setting times sufficiently to be used for shotcreting.

One reference teaches broadly that the α-hydroxy carbonyl group, is very active in retarding the hydration of portland cement, the degree of hydration being a measure of its degree of hardening. In this reference; Proceedings of the International Symposium on the Chemistry of Cement, Washington, 1960, pages 924–925; J. H. Taplin classifies hydroxyacetic acid as a strong retarder on the basis of data obtained from cement paste specimens having water-cement ratios of 0.30 and containing one percent admixture by weight. Lactic acid, classified as having a negligible retarding effect, is called exceptional in that it contains the α-hydroxy carbonyl group but does not retard. This observation by Taplin indicates the difficulty of making broad generalizations concerning the effects of classes of compounds on the setting times of portland cement. Taplin nonetheless concludes that "it appears to be a general rule, that for an organic substance to retard cement, it must have at least two oxygen atoms each bound to a single but different carbon atom in such a way that the oxygen atoms can approach each other." The Taplin reference contains no teaching or suggestion that hydroxyacetic or lactic acid might be useful as an accelerator for portland cement compositions and plainly leads away from the present invention.

A second reference which similarly teaches away from the present invention is U.S. Pat. No. 3,144,347, issued Aug. 11, 1964 to E. I. du Pont de Nemours & Company. The '347 patent teaches the use of hydroxyacetic acid, lactic acid, and their sodium, calcium, potassium and amine salts as retarding admixtures in concentrations ranging from about 0.001 to 3.5 weight percent relative to the cement. The patent recites further (Column 1, lines 33-35) that "most often less than about 0.8 weight percent will be used, and particularly advantageous results are obtained within the narrow range of 0.01 to 0.1 weight percent", and all of the specific examples contained in columns 3 and 4 of the patent relate to the use of less than 0.8 weight percent of the foregoing retardant admixtures in concretes. The second paragraph of the patent defines the scope of the asserted invention as relating to "a small class of monohydroxy organic compounds . . . which not only serve as excellent water reducing retardants but at the same time causes a significant increase in the compressive strength of the concrete." The sole and plain teaching of the '347 patent is thus that the recited compounds are useful as retarding agents and concomitantly as ultimate strength increasing agents.

The only suggestion whatsoever in the prior art that a specific α-hydroxy carbonyl compound may have some utility as an accelerator is found in Japanese Patent Application Publication 13680 of 1972, dated Apr. 24, 1972 and assigned to Hani Chemical Company, Ltd., by Kenji Harazawa. Precisely what the Harazawa patent does or does not teach one of ordinary skill in this art is at best unclear. It states that calcium monglycolate and calcium diglycolate effect a limited reduction in the initial setting time of portland cement, and further that "it is particularly preferred to use portland cement and mixed gypsum plaster." I am not sure what "gypsum plaster" is, or why one would want to mix it with cement. Although the terminology is ambiguous, calcium diglycolate is generally used to refer to the calcium salt of diglycolic acid, which is not an α-hydroxy carbonyl compound. Even giving Harazawa the benefit of all doubts, his preferred range is between 0.05 and 0.15 percent admixture with respect to the cement, and the shortest final setting time disclosed for either compound is one hour and forty-five minutes and the shortest final setting time for calcium monoglycolate is one hour and fifty minutes, as measured by JIS R-5201, a Vicat Needle test. For reasons stated above, it is not possible to extrapolate with respect to the effect of higher concentrations of admixture, and Harazawa contains no suggestion whatsoever that the salts recited by him, or any other compounds, might make useful accelerators for applications requiring fast setting times such as shotcreting, plugging compounds, and quick-setting mortars. The patent contains no suggestion of the invention disclosed and claimed herein.

SUMMARY OF THE INVENTION

The present invention is based upon the discovery that certain α-hydroxy carbonyl compounds, when mixed with portland cement compositions in particular cocentrations relative to the cement, may be used as accelerators for such compositions in broad classes of applications. More particularly hydroxyacetic acid and its sodium, potassium, calcium, lithium, zinc, and triethanolamine salts; lactic acid and its sodium, potassium, and calcium salts; sodium dl-mandelate; and sodium 2-methyllactate, when admixed in concentrations of from about 0.5 to 10 weight percent relative to the cement, have been found to function as suitable accelerators for many applications, although in some cases they may function as retardants in lower and in higher concentrations.

The precise range of concentration of the admixture relative to the cement over which the admixture functions as an accelerator in accordance with the present invention will vary for specific applications depending upon the chemical identity of the admixture, the water-cement ratio, the nature and quantity of aggregates in the composition, the composition of the cement, the order in which the ingredients of the composition are mixed, and the temperature and other conditions under which the composition is mixed and set. For example, potassium hydroxyacetate was found to accelerate the final setting time of cement pastes as measured by the Vicat Needle test when present in concentrations greater than about 0.5% by weight relative to the cement and to retard the setting time in concentrations less than this value. In mortar made from the same cement the salt functions as an accelerator as determined by the Proctor Needle test initial setting time in concentrations greater than about 1.3% and as a retardant below this value. Although the concentration range over which the admixtures discloses herein function as accelerators is between about 0.5 to 10 percent, the term "accelerating concentration" is used herein in accordance with the teachings hereof to more precisely specify the range within which each particular admixture acts as an accelerator, taking into account variations in the several factors referred to above.

BRIEF DESCRIPTION OF THE DRAWINGS

The invention may be better appreciated if reference is made to the following drawings.

EFFECT OF ADMIXTURES OF THE PRESENT INVENTION ON SETTING TIMES

Figure 1:
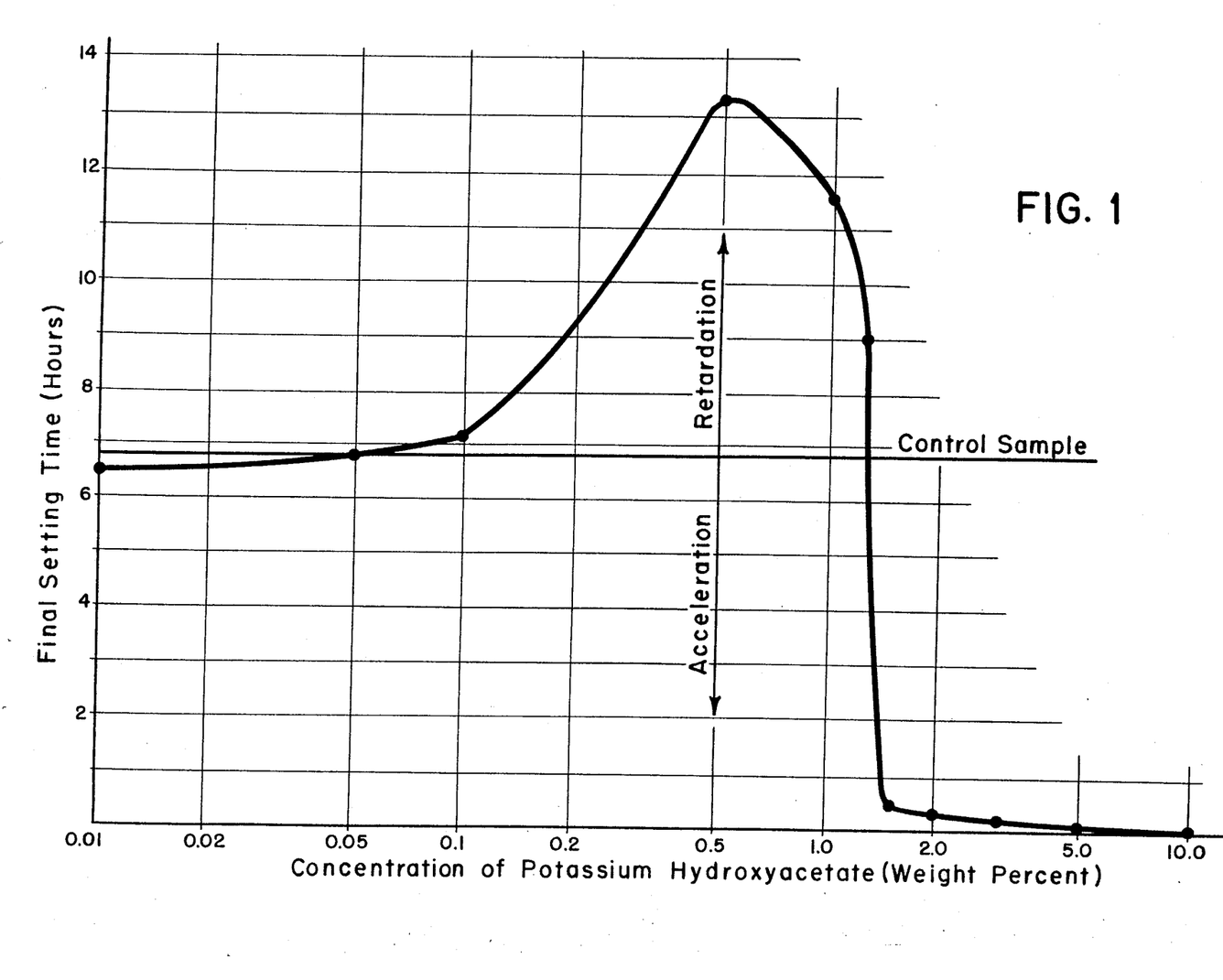
FIG. 1 is a plot of the initial setting time of mortars as measured by the Proctor Needle method versus concentration of potassium hydroxyacetate.

FIG. 1 shows a plot of the initial setting time (in hours) of a mortar as a function of the concentration of potassium hydroxyacetate in which the horizontal scale is logarithmic and indicates the weight percent of admixture relative to the cement of the mortar. Atlas Type I cement was employed and mixed with 2½ parts by weight Federal Fine sand for each part of cement. The water-cement ratio was 0.50 by weight and setting times were measured by the Proctor Needle method. A control sample containing no admixture was found to have an initial setting time of 6.8 hours and is represented on the graph by the horizontal line. All points above the line indicate that the admixture is functioning as a retardant and at all points below the line the admixture is functioning as an accelerator. The plot reveals that the potassium hydroxyacetate functions as an accelerator at concentrations below 0.05 weight percent and above 1.3 weight percent. The foregoing concentration are therefore referred to herein as "crossover points", useful in defining the range of concentration over which each specific admixture functions as an accelerator. Note that between the 1.3% concentration crossover point and the next point on the plot at about 1.6% concentration, the slope of the curve is almost vertical and the setting time is reduced from 6.8 hours to less than one half hour. At a concentration of 5.0% the setting time is about five minutes.

Table I lists the crossover points from retardation to acceleration for hydroxyacetic acid and some of its salts, as determined from plots of initial setting time (Proctor Needle) versus concentration similar to FIG. 1. Admixtures of this table other than potassium hydroxyacetate seem to exhibit a somewhat less steep slope than that of FIG. 1 about the crossover point. The admixtures in concentrations greater than the crossover point values cause acceleration. The mortar samples tested are the same as those employed with respect to the results shown in FIG. 1.

TABLE I

| Admixture | Weight Percent of Salt at Crossover Concentration |
| --- | --- |
| Hydroxyacetic Acid | 1.1% |
| Lithium Hydroxyacetate | 1.4% |
| Sodium Hydroxyacetate | 1.25% |
| Potassium Hydroxyacetate | 1.3% |
| Calcium Hydroxyacetate | 2.2% |

Plots of setting times versus concentration for different admixtures of the present invention do not resemble FIG. 1 in every case, since the shape of the curves depends upon a number of factors, such as the identity of the admixture, the water-cement ratio, and the temperature of the mix, which influence the rate of hardening of portland cement mixes generally. Thus not all accelerators within the scope of this invention function as retardants in concentrations that are without the scope of the invention insofar as is presently known.

Figure 4:
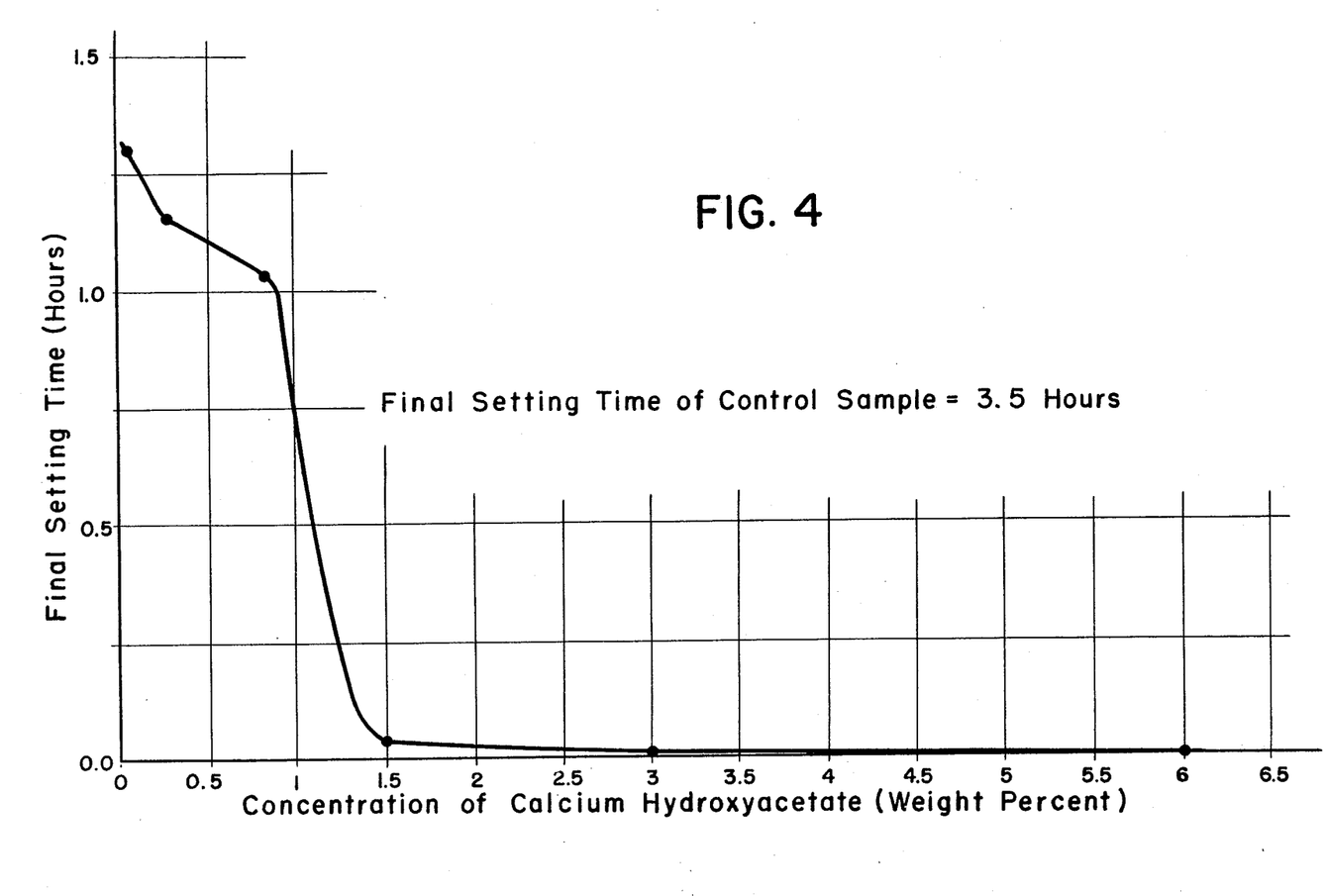
FIG. 4 is a plot of the final setting time of mortars as measured by the Vicat Needle method versus concentration of calcium hydroxyacetate.

As may be seen in FIG. 4, calcium hydroxyacetate, prepared by neutralizing a 70-percent solution of hydroxyacetic acid with calcium hydroxide, functions as an accelerator under certain conditions over the entire concentration range from 0.05 to 6.0 weight percent as measured by the Vicat Needle test final setting time. The mortar for these tests was made up of 2.5 pounds of Federal Fine Sand per pound of Atlas Cement with a water-cement ratio of 0.30. The final setting time for a control mix containing no admixture was 3.5 hours. The curve exhibits a sharp break between 0.83 and 1.5 weight percent, but the admixture functions as an accelerator on either side of the break. As is evident from the figure, under those conditions calcium hydroxyacetate is suitable for shotcreting, plugging compounds, quick-setting mortar compounds, and other applications requiring very short setting times only in concentrations in excess of about 1.5 weight percent relative to the cement. Under the conditions employed to obtain the crossover point for calcium hydroxyacetate listed in Table I, the graph of initial setting time, measured by the Proctor Needle method in this case versus concentration more nearly resembles FIG. 1 than FIG. 4 in that the setting time is retarded over a portion of the concentration range tested. A crossover therefore occurs between retardation and acceleration.

The triethanolamine salt of hydroxyacetic acid functions as an accelerator in cement paste with a water-cement ratio of 0.30 at concentrations as low as 0.5 percent and appears to function as an accelerator at all higher concentrations, at least up to about 10%. Similarly, the sodium salt of dl-mandelic acid does not appear to function as a retardant.

Note that hydroxyacetic acid, lactic acid, 2-methyllactic acid, and dl-mandelic acid are structurally similar in that they all have one hydroxy group and one carboxylic acid group, and in particular the hydroxy group is located in the "α" position relative to the carbonyl carbon atom.

Generally, admixtures of the present invention are more effective as accelerators if they are added to the other ingredients of the cement composition before water is added to the mix. For example, a higher concentration of admixture is required to achieve a given degree of acceleration if moist or wet sand has been mixed with the cement before the accelerator is added.

The chemical reactions which lead to the hardening of cement are not well understood. Many researchers believe that gypsum acts to retard the setting time of cement by supplying sulfate ions to react with tricalcium aluminate present in the cement. The sulfate ions react with the surface of the tricalcium aluminate particles, producing a compound called ettringite which coacts the outer surface of the particle. Lime also is believed to precipitate on the particles. The relatively impervious coating of ettringite and lime prevents the tricalcium aluminate from taking part in the hardening reactions. When all of the sulfate ions have been consumed, it is believed that the ettringite converts to a monosulfate, which does not adhere to the surface of the tricalcium aluminate particles. Thus as the ettringite converts to the monosulfate, the impervious jacket coating the tricalcium aluminate breaks up, allowing the tricalcium aluminate to take part in the hardening reactions. A possible explanation for the accelerating effect of the admixtures of the present invention is that the compounds either prevent the formation of ettringite or attack and solubilize the ettringite and lime coatings which retard the hardening of tricalcium aluminate.

PROPERTIES OF CEMENT COMPOSITIONS CONTAINING ADMIXTURES OF THE PRESENT INVENTION

Accelerating admixtures in accordance with the present invention may be employed in connection with all uses of portland cement compositions in which acceleration of the setting time is desirable. In this section effects of admixtures of the present invention on cement compositions other than effects on setting times are discussed.

Salts of the present invention may be made by neutralizing the selected α-hydroxy carboxylic acid with the appropriate base. These salts have an approximately neutral pH and hence are not caustic and may be used and processed without taking the special safety precautions required in connection with sodium carbonate-sodium aluminate accelerators presently used for shotcreting.

The accelerating admixtures of the invention cause neither reaction with ferrous metals nor electrolytic action between different metals, and are suitable for use in connection with reinforced and prestressed concretes as well as other applications involving a cement, mortar, or concrete-metal interface.

Unlike mortar admixed with sodium carbonate-sodium aluminate shotcrete accelerators in commercial use, mortars accelerated in accordance with the present invention generally exhibit excellent early strength, rendering them especially suitable for shotcreting since thinner layers of mortar may be used than are presently required in many such applications.

Figure 2:
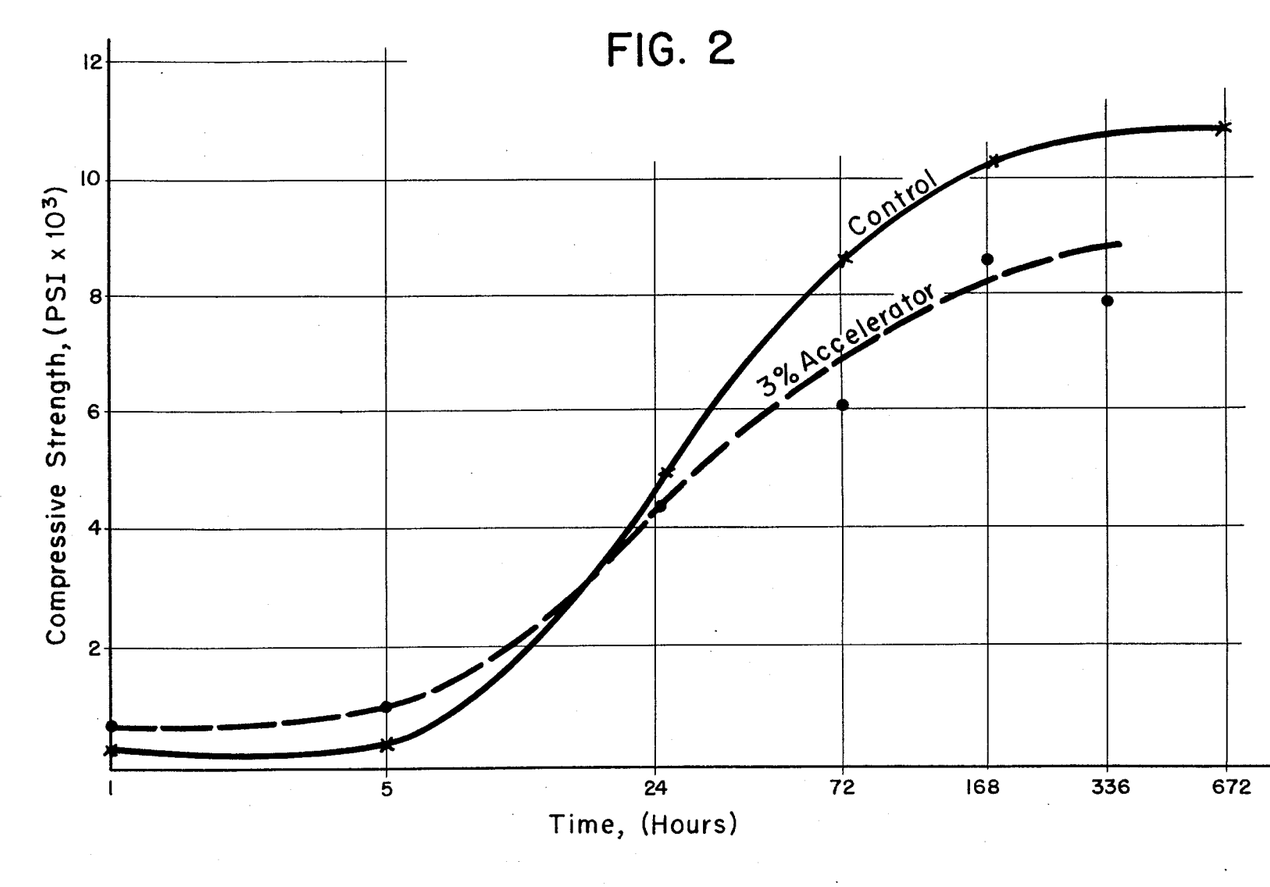
FIG. 2 is a plot of compressive strength versus time for a control cement and cement containing 3% potassium hydroxyacetate.

Accelerating admixtures usually are found to reduce somewhat the ultimate compressive strength of the hardened composition relative to the strength of control compositions which contain no admixture, while retarders ordinarily increase the ultimate strength. Accelerators of the present invention also generally exhibit this behavior. In the case of certain of these accelerators, however, the reduction in ultimate strength is much less than with prior-art accelerators. FIG. 2 is a plot of the compressive strength (ASTM C-109) Atlas cement versus time (hours), both for the cement alone with no additives and with potassium hydroxyacetate in concentrations of 3% relative to the cement. The water-cement ratio was 0.35. FIG. 2 shows that the accelerator admixture enhanced the compressive strength somewhat at times up to 15 hours, and decreases compressive strength slightly over 15 hours, the accelerated cement achieving a 14-day (336 hour) compressive strength over 80% of that of the plain cement.

An additional application for which the present invention is particularly suited is as an ingredient in quick-setting-mortar compounds. As discussed above, quick-setting-mortar compounds are widely used to repair damaged concrete. This application requires shortened setting times and in addition it is desirable that the ultimate strength of the mortar patch be high so that the repair will be permanent. A quick-setting-mortar compound was prepared using potassium hydroxyacetate which exhibited a 28-day compressive strength of over 9,000 pounds per square inch, as measured by ASTM Test C-109. By contrast, two commercially available quick-setting-mortar compounds using sodium carbonate-sodium aluminate accelerators had a 28-day compressive strength of roughly 3,000 pounds per square inch. Thus quick-setting-mortar compounds can be made using the present invention which have approximately three times the compressive strength of prior-art quick-setting-mortar compounds.

Figure 3:
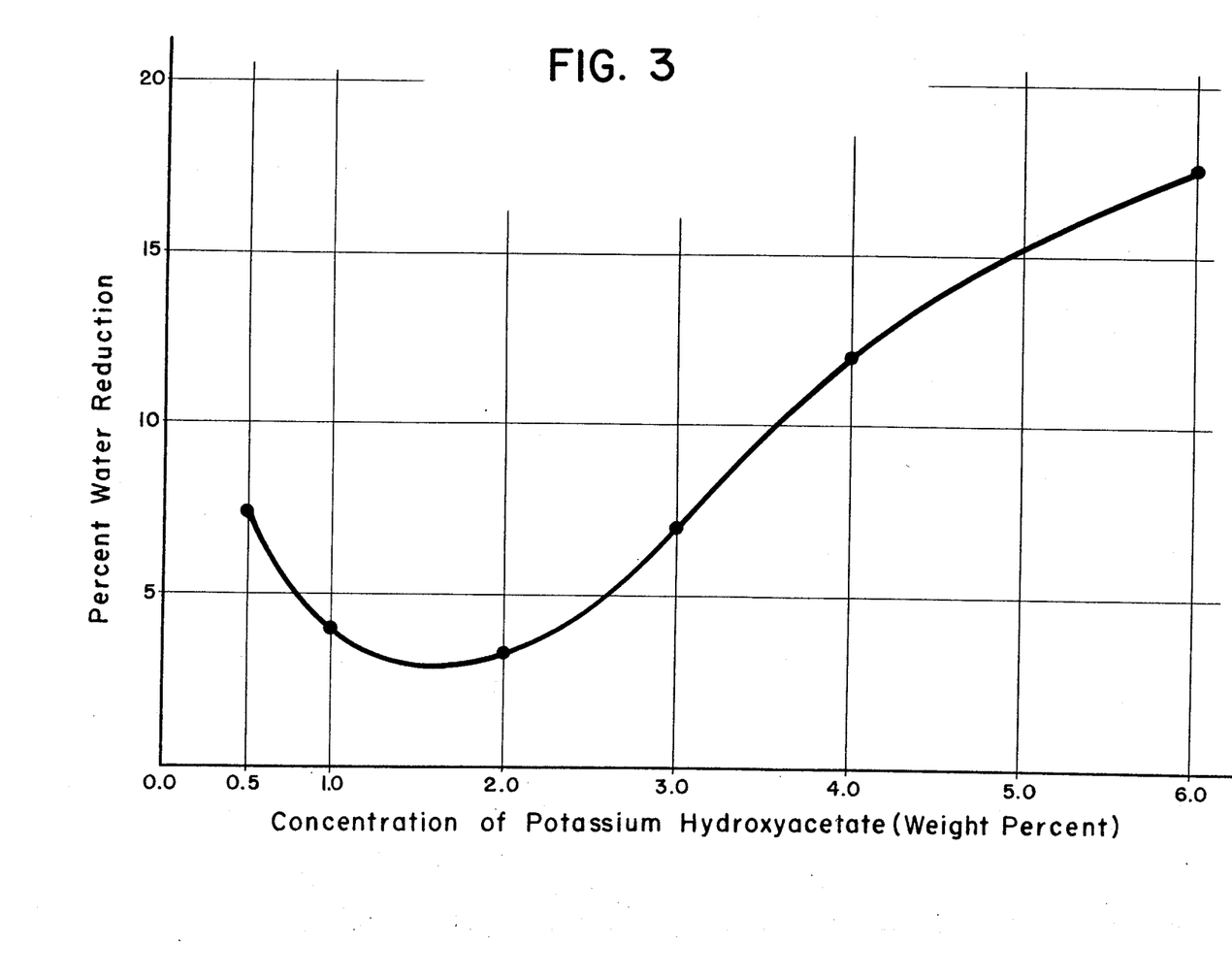
FIG. 3 is a plot of percent water reduction in mortar versus concentration of potassium hydroxyacetate.

Generally admixtures of the present invention function not only as accelerators but also as water-reducing agents. In a series of measurements made on a flow table the percent of water reduction was found to vary as a function of the concentration of potassium hydroxyacetate in mortar. The percent water reduction versus concentration curve, shown in FIG. 3, exhibits a minimum near the concentration of 1.5% by weight salt relative to the cement, which, in this instance, coincides with the crossover point for this salt. The percent water reduction at this minimum is approximately 2.8%. As the concentration of the admixture is increased past the minimum, the percent water reduction also increases, roughly linearly.

EXAMPLES

The following specific examples of portland cement compositions and their effects on setting time will facilitate a better understanding of the invention.

EXAMPLE I

The following mortar was prepared:
Atlas Type I Cement—4 lbs.
Federal Fine Sand—10 lbs.
water—2 lbs.
potassium hydroxyacetate—1.9 oz.
The concentration of potassium hydroxyacetate relative to the cement was 3% by weight. The time to initial set of this mortar, as measured by the Proctor Needle test was 11 minutes.

EXAMPLE II

Example I was repeated except that 1.9 oz. of sodium hydroxyacetate, corresponding to 3% by weight salt, was substituted for the potassium hydroxyacetate. The time to initial set of this mortar, as measured by the Proctor Needle Test, was 5 minutes.

EXAMPLE III

Example I was repeated except that 1.9 oz. of the sodium salt of dl-mandelic acid was substituted for the potassium hydroxyacetate. The concentration of the salt relative to the cement was 3.0% by weight. The time to final set of this mortar by the Vicat test was 1.75 minutes.

EXAMPLE IV

The following mortar was prepared:
Atlas Type I Cement—4 lbs.
ASTM Concrete Sand—8 lbs.
water—1.72 lbs.
sodium hydroxyacetate—1.9 oz.
The concentration of sodium hydroxyacetate relative to the cement was 3% by weight. The mortar is particularly suitable for shotcrete applications. The time to initial set as measured by the Proctor Needle test was 0.45 minutes.

EXAMPLE V

The following mortar was prepared:
Atlantic Type I Cement—10 lbs.
Federal Fine Sand—1 lbs.
water—3 lbs.
sodium hydroxyacetate—3.68 oz.
The concentration of the salt relative to the cement was 2.3% by weight. This mortar is particularly suitable as a quick-setting-mortar compound. The time to final set as measured by the Vicat Needle method was 5 minutes.

EXAMPLE VI

The following mortar was prepared:
Atlas Type I Cement—7.8 lbs.
Federal Fine Sand—1.9 lbs.
water—2.8 lbs.
sodium lactate—2.5 oz.
The concentration of the salt relative to the cement was 2 percent by weight. The final setting time as measured by the Vicat Needle test was two minutes.

EXAMPLE VII

Mortar of the following proportions was mixed in the nozzle of a shotcreting rig and sprayed on a vertical wall:
Atlas Type I Cement—1 part by weight
sand—3 parts by weight
water—.25 parts by weight
sodium hydroxyacetate—04 parts by weight.
The final setting time of the mortar applied to the wall was less than one minute as measured by the Proctor Needle test. Core samples cut from the mortar exhibited a compressive strength of 1080 psi one hour after application, 3870 psi after eight hours, and a 28-day ultimate strength of 5520 psi. Mortar containing 3 percent of a conventional sodium aluminate-sodium carbonate accelerator typically has a compressive strength of less than 800 psi in eight hours and an ultimate strength of roughly 3000 psi.

EXAMPLE VIII

The following mortar was prepared:
Atlat Type I Cement—1 part by weight
Federal Fine Sand—0.2 parts by weight
water—0.35 parts by weight
potassium hydroxyacetate—0.02 parts by weight
The concentration of potassium hydroxyacetate relative to the cement was two percent by weight. The time to final set for this mortar as measured by the Vicat Needle test was 1.1 minutes. This mortar is particularly suitable as a plugging compound.

EXAMPLE IX

Mortar of the following proportions was prepared:
Atlas Type I Cement—1 part by weight
Federal Fine Sand—2.5 parts by weight
water—0.30 parts by weight
calcium hydroxyacetate—0.03 parts by weight.
The calcium hydroxyacetate was prepared by neutralizing a 70 percent solution of hydroxyacetic acid with an aqueous solution of calcium hydroxide. The time to final set of this mortar as measured by the Vicat Needle test was 2.5 minutes.

EXAMPLE X

The following concrete was prepared:
Atlas Type I Cement—10 lbs.
Federal Fine Sand—10 lbs.
coarse aggregate—5 lbs.
water—3 lbs.
sodium hydroxyacetate—8 oz.
This concrete had a final setting time of 12 minutes as measured by the Vicat Needle method and a compressive strength of 1060 psi one hour after mixing. It is particularly suitable as a concrete patching compound.

It will be recognized by those familiar with this art that modifications of the foregoing specific examples may be made without departing from the scope and spirit of the invention, which is limited solely in accordance with the claims hereof. For example, instead of using one of the $\alpha$-hydroxy carbonyl compounds recited in this application alone, mixtures of such compounds may be employed to similar advantage. If a mixture of $\alpha$-hydroxy carbonyl compounds is used, the total concentration of $\alpha$-hydroxy carbonyl compounds relative to the cement must be an accelerating concentration.

What is claimed is:

1. A process of accelerating the setting time of a quantity of portland cement composition for a particular water-cement ratio, comprising the steps of:
   (a) providing, as a chemical admixture, an α-hydroxy carbonyl compound selected from the group consisting of hydroxyacetic acid and its sodium, potassium, lithium, zinc, and triethanolamine salts; sodium 2-methyllactate; sodium dl-mandelate; and mixtures thereof; and
   (b) admixing with said cement composition an amount of said α-hydroxy carbonyl compound sufficient to accelerate the setting time of the portland cement composition, at such water-cement ratio, as compared with its setting time in the absence of any admixture.

2. The process according to claim 1 in which said chemical admixture, and portland cement are essentialy the only constituents of the composition influencing its setting time.

3. The process according to claim 1 in which said chemical admixture, portland cement, and water are essentially the only constituents of the composition influencing its setting time.

4. The process according to claim 3 in which the α-hydroxy carbonyl compound is sodium hydroxyacetate.

5. The process according to claim 4 in which the concentration of the α-hydroxy carbonyl compound relative to the cement is in a range whereby the final setting time of the composition as measured by the Vicat Needle test is less than one hour.

6. The process according to claim 5 in which the portland cement composition includes a quantity of water to constitute a cement paste and the concentration of the α-hydroxy carbonyl compound relative to the cement is in the range of from about 0.5 to about 10 weight percent.

7. The process according to claim 5 in which the portland cement composition includes quantities of water and aggregate to constitute a mortar or a concrete and the concentration of the α-hydroxy carbonyl compound relative to the cement is in the range of from about 1.1 to about 10 weight percent.

8. A process of accelerating the setting time of a quantity of an aggregate containing portland cement composition for a particular water-cement ratio, comprising the steps of:
   (a) providing, as a chemical admixture, an α-hydroxy carbonyl compound selected from the group consisting of hydroxyacetic acid and its sodium, potassium, lithium, zinc, and triethanolamine salts; lactic acid and its sodium, potassium, and calcium salts; sodium 2-methyllactate; sodium dl-mandelate; and mixtures thereof; and
   (b) admixing with said cement composition an amount of said α-hydroxy carbonyl compound sufficient to accelerate the setting time of the portland cement composition, at such water-cement ratio, as compared with its setting time in the absence of any admixture;
   wherein said chemical admixture, portland cement aggregate, and water are essentially the only constituents of the composition influencing its setting time.

9. The process according to claim 8 in which the α-hydroxy carbonyl compound is sodium lactate.

10. The process according to claim 8 in which the concentration of the α-hydroxy carbonyl compound relative to the cement is in a range whereby the final setting time of the composition as measured by the Vicat Needle test is less than one hour.

11. A process of preparing a quantity of portland cement composition for shotcreting, comprising the steps of:
    (a) providing, as a chemical admixture, an α-hydroxy carbonyl compound selected from the group consisting of hydroxyacetic acid and its sodium, potassium, calcium, lithium, zinc, and triethanolamine salts; sodium 2-methyllactate; sodium dl-mandelate; and mixtures thereof;
    (b) mixing portland cement, aggregate, and water to form a quantity of shotcrete having a particular water-cement ratio; and
    (c) admixing with the portland cement, aggregate, and water an amount of said α-hydroxy carbonyl compound sufficient to accelerate the final setting time as measured by the Proctor Needle test, at such water-cement ratio, to a value of less than fifteen minutes, the setting time of the shotcrete thereby being accelerated as compared with its setting time in the absence of any admixture.

12. The process according to claim 11 in which said chemical admixture, aggregate, water, and portland cement are essentially the only constituents of the composition influencing its setting time.

13. The process according to claim 12 in which the α-hydroxy carbonyl compound is calcium hydroxyacetate.

14. The process according to claim 12 in which the concentration of the α-hydroxy carbonyl compound relative to the cement is in the range of from about 1.1 to about 10 weight percent.

15. A process of preparing a quantity of portland cement composition for shotcreting, comprising the steps of:
    (a) providing, as a chemical admixture, an α-hydroxy carbonyl compound selected from the group consisting of hydroxyacetic acid and its sodium, potassium, lithium, zinc, and triethanolamine salts; sodium 2-methyllactate; sodium dl-mandelate; and mixtures thereof;
    (b) mixing portland cement, aggregate, and water to form a quantity of shotcrete having a particular water-cement ratio; and
    (c) admixing with the portland cement, aggregate, and water an amount of said α-hydroxy carbonyl compound sufficient to accelerate the final setting time as measured by the Proctor Needle test, at such water-cement ratio, to a value of less than fifteen minutes, the setting time of the shotcrete thereby being accelerated as compared with its setting time in the absence of any admixture.

16. The process according to claim 15 in which said chemical admixture, aggregate, water, and portland cement are essentially the only constituents of the composition influencing its setting time.

17. The process according to claim 16 in which the concentration of the α-hydroxy carbonyl compound relative to the cement is in the range of from about 1.1 to about 10 weight percent.

18. A process of preparing a quantity of portland cement composition for shotcreting, comprising the steps of:

(a) providing, as a chemical admixture, an α-hydroxy carbonyl compound selected from the group consisting of hydroxyacetic acid and its sodium, potassium, calcium, lithium, zinc, and triethanolamine salts; lactic acid and its sodium, potassium, and calcium salts; sodium 2-methyllacetate; sodium dl-mandelate; and mixtures thereof;

(b) mixing portland cement, aggregate, and water to form a quantity of shotcrete having a particular water-cement ratio; and (c) admixing with the portland cement, aggregate, and water an amount of said α-hydroxy carbonyl compound sufficient to accelerate the final setting time as measured by the Proctor Needle test, at such water-cement ratio, to a value of less than fifteen minutes, the setting time of the shotcrete thereby being accelerated as compared with its setting time in the absence of any admixture;
wherein said chemical admixture, aggregate, water, and portland cement are essentially the only constituents of the composition influencing its setting time.

19. The process according to claim 18 in which the concentration of the α-hydroxy carbonyl compound relative to the cement is in the range of from about 1.1 to about 10 weight percent.

20. A portland cement concrete patching compound mixable with water to a selected water-cement ratio and comprising portland cement, aggregate, and, as a chemical admixture, an α-hydroxy carbonyl compound selected from the group consisting of hydroxyacetic acid and its sodium, potassium, lithium, zinc, and triethanolamine salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test at such water-cement ratio, to a value of less than one hour, the setting time of the concrete patching compound thereby being accelerated as compared with its setting time in the absence of any admixture.

21. The portland cement conrete patching compound according to claim 20 in which said chemical admixture, aggregate, and portland cement are essentially the only constituents of the composition influencing its setting time.

22. A portland cement quick-setting-mortar compound mixable with water to a selected water-cement ratio and comprising portland cement, aggregate, and, as a chemical admixture, an α-hydroxy carbonyl compound selected from the group consisting of hydroxyacetic acid and its sodium, potassium, calcium, lithium, zinc, and triethanolamine salts; sodium 2-methyllacetate; sodium dl-mandelate; and mixtures thereof; the concentration of the α-hydroxy carbonyl compound relative to the cement being sufficient to accelerate the final setting time, as measured by the Vicat Needle test, at such water-cement ratio, to a value of less than thirty minuts, the setting time of the concrete patching compound thereby being accelerated as compared with its setting time in the absence of any admixture.

23. The portland cement quick-setting-mortar compound according to claim 20 in which said chemical admixture, aggregate, and portland cement are essentially the only constituents of the composition influencing its setting time.

24. A portland cement plugging compound mixable with water to a selected water-cement ratio and comprising portland cement, aggregate, and, as a chemical admixture, an α-hydroxy carbonyl compound selected from the group consisting of hydroxyacetic acid and its sodium, potassium, calcium, lithium, zinc, and triethanolamine salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test, as such water-cement ratio, to a value of less than fifteen minutes, the setting time of the concrete patching compound thereby being accelerated as compared with its setting time in the absence of any admixture.

25. The portland cement plugging compound according to claim 24 in which said chemical admixture, aggregate, and portland cement are essentially the only constituents of the composition influencing its setting time.

26. A portland cement concrete patching compound mixable with water to a selected water-cement ratio and consisting of portland cement, aggregate, and, as a chemical admixture, an α-hydroxy carbonyl compound selected from the group consisting of hydroxyacetic acid and its sodium, potassium, lithium, zinc, and triethanolamine salts; lactic acid and its sodium, potassium, and calcium salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test at such water-cement ratio, to a value of less than one hour, the setting time of the concrete patching compound thereby being accelerated as compared with its setting time in the absence of any admixture.

27. A portland cement quick-setting-mortar compound mixable with water to a selected water-cement ratio and consisting of portland cement, aggregate, and, as a chemical admixture, an α-hydroxy carbonyl compound selected from the group consisting of hydroxyacetic acid and its sodium, potassium, calcium, lithium, zinc, and triethanolamine salts; lactic acid and its sodium, potassium, and calcium salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test, at such water-cement ratio, to a value of less than thirty minutes, the setting time of the quick-setting-mortar compound thereby being accelerated as compared with its setting time in the absence of any admixture.

28. A portland cement plugging compound mixable with water to a selected water-cement ratio and consisting of portland cement, aggregate, and, as a chemical admixture, an α-hydroxy carbonyl compound selected from the group consisting of hydroxyacetic acid and its sodium, potassium, calcium, lithium, zinc, and triethanolamine salts; lactic acid and its sodium, potassium, and calcium salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test, at such water-cement ratio, to a value of less than fifteen minutes, the setting time of the plugging compound thereby being accelerated as compared with its setting time in the absence of any admixture.

29. The portland cement concrete patching compound according to claim 20 in which the concentration of the α-hydroxy carbonyl compound relative to the cement is in the range of from about 1.1 to about 10 weight percent.

30. The portland cement quick-setting-mortar compound according to claim 22 in which the concentration of the α-hydroxy carbonyl compound relative to the cement is in the range of from about 1.1 to about 10 weight percent.

31. The portland cement plugging compound according to claim 24 in which the concentration of the α-hydroxy carbonyl compound relative to the cement is in the range of from about 1.1 to about 10 weight percent.

32. The portland cement concrete patching compound according to claim 26 in which the concentration of the α-hydroxy carbonyl compound relative to the cement is in the range of from about 1.1 to about 10 weight percent.

33. The portland cement quick-setting-mortar compound according to claim 27 in which the concentration of the α-hydroxy carbonyl compound relative to the cement is in the range of from about 1.1 to about 10 weight percent.

34. The portland cement plugging compound according to claim 28 in which the concentration of the α-hydroxy carbonyl compound relative to the cement is in the range of from about 1.1 to about 10 weight percent.

35. A process of accelerating the setting time of a quantity of portland cement composition for a particular water-cement ratio, comprising the steps of:
  (a) providing, as a chemical admixture, an α-hydroxy carbonyl compound selected from the group consisting of hydroxyacetic acid and its sodium, potassium, lithium, zinc, and triethanolamine salts; lactic acid and its sodium, potassium, and calcium salts; sodium 2-methyllactate; sodium dl-mandelate; and mixtures thereof; and
  (b) admixing with said cement composition an amount of said α-hydroxy carbonyl compound sufficient to accelerate the setting time of the portland cement composition, at such water-cement ratio, as compared with its setting time in the absence of any admixture; wherein the accelerated composition contains only noncaustic ingredients.

36. A portland cement concrete patching compound mixable with water to a selected water-cement ratio and consisting essentially of portland cement, aggregate, and, as a chemical admixture, an α-hydroxy carbonyl compound selected from the group consisting of hydroxyacetic acid and its sodium, potassium, lithium zinc, and triethanolamine salts; lactic acid and its sodium, potassium, and calcium salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test at such water-cement ratio, to a value of less than one hour, the setting time of the concrete patching compound thereby being accelerated as compared with its setting time in the absence of any admixture, the portland cement aggregate, and the α-hydroxy carbonyl compound being the only constituents of the concrete patching compound influencing its setting time.

37. A portland cement quick-setting-mortar compound mixable with water to a selected water-cement ratio and consisting essentially of portland cement, aggregate, and, as a chemical admixture, an α-hydroxy carbonyl compound selected from the group consisting of hydroxyacetic acid and its sodium, potassium, calcium, lithium, zinc, and triethanolamine salts; lactic acid and its sodium, potassium, and calcium salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test, at such water-cement ratio, to a value of less than thirty minutes, the setting time of the quick-setting-mortar compound thereby being accelerated as compared with its setting time in the absence of any admixture, the portland cement aggregate, and the α-hydroxy carbonyl compound being the only constituents of the quick-setting-mortar compound influencing its setting time.

38. A portland cement plugging compound mixable with water to a selected water-cement ratio and consisting essentially of portland cement, aggregate, and, as a chemical admixture, an α-hydroxy carbonyl compound selected from the group consisting of hydroxyacetic acid and its sodium, potassium, calcium, lithium, zinc, and triethanolamine salts; lactic acid and its sodium, potassium, and calcium salts; sodium 2-methyllactate; sodium dl-mandelate; and mixtures thereof; the concentration of the α-hydroxy carbonyl compound relative to the cement being sufficient to accelerate the final setting time, as measured by the Vicat Needle test, at such water-cement ratio, to a value of less than fifteen minutes, the setting time of the plugging compound thereby being accelerated as compared with its setting time in the absence of any admixture, the portland cement aggregate, and the α-hydroxy carbonyl compound being the only constituents of the plugging compound influencing its setting time.

* * * * *

UNITED STATES PATENT AND TRADEMARK OFFICE
CERTIFICATE OF CORRECTION

PATENT NO. : 4,264,368
DATED : April 28, 1981
INVENTOR(S) : Raymond J. Schutz

It is certified that error appears in the above—identified patent and that said Letters Patent is hereby corrected as shown below:

Column 1, line 62, "bride" should read --bridge--.

Column 2, line 14, "acceleratiion" should read --acceleration--.

Column 4, line 47, "monglycolate" should read --monoglycolate--.

Column 5, line 9, "cocentrations" should read --concentrations--

Column 5, line 41, "discloses" should read --disclosed--.

Column 6, line 15, "concentration" should read --concentrations--

Column 7, line 1, "those" should read --these--.

Column 9, line 55, "lbs." should read --lb.--.

Column 10, line 12, "04" should read --0.04--.

Column 10, line 26, "Atlat" should read --Atlas--.

Column 11, line 20, "essentialy" should read --essentially--.

Column 11, line 48, "aggregate containing" should read --aggregate-containing--.

Column 11, line 64, "cement" should read --cement,--.

Column 13, line 6, "methyllacetate" should read --methyllactate--.

Column 13, line 41, "conrete" should read --concrete--.

UNITED STATES PATENT AND TRADEMARK OFFICE
CERTIFICATE OF CORRECTION

PATENT NO. : 4,264,368

DATED : April 28, 1981

INVENTOR(S) : Raymond J. Schutz

It is certified that error appears in the above—identified patent and that said Letters Patent is hereby corrected as shown below:

Column 13, line 58 "minuts" should read --minutes--.

Column 13, line 62, "20" should read --22--.

Column 15, lines 40 and 41, close up the space between "compared" and "with".

Column 15, lines 42 and 43, do not indent.

Column 16, line 8 "cement" should read --cement,--.

In the Drawing

Figure 1, the lengend "Final Setting Time" should read --Initial Setting Time--.

Signed and Sealed this

Twenty-ninth Day of September 1981

[SEAL]

Attest:

Attesting Officer

GERALD J. MOSSINGHOFF

Commissioner of Patents and Trademarks